May 5, 1942.　　　　W. T. HEDLUND　　　　2,281,690
REFRIGERATOR
Filed June 5, 1940
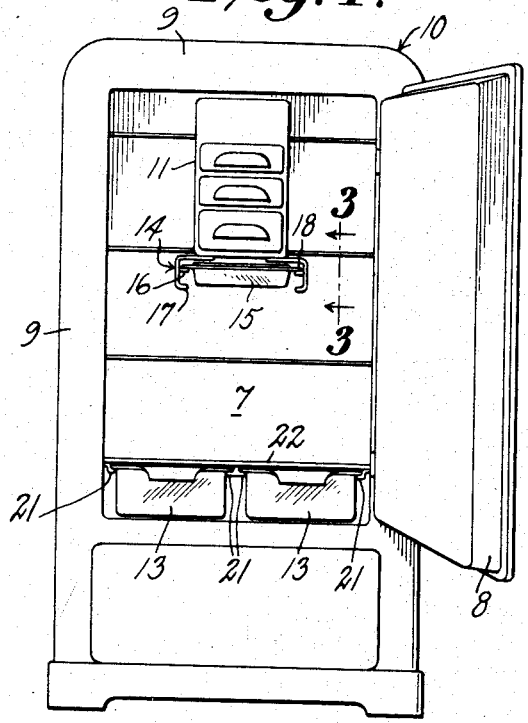
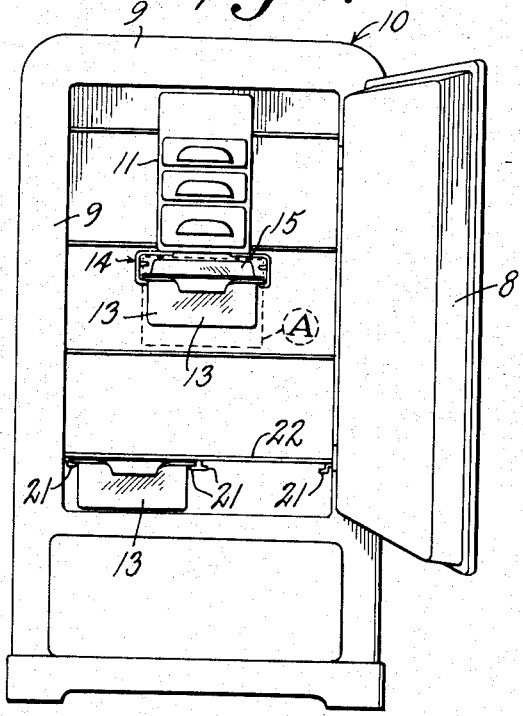
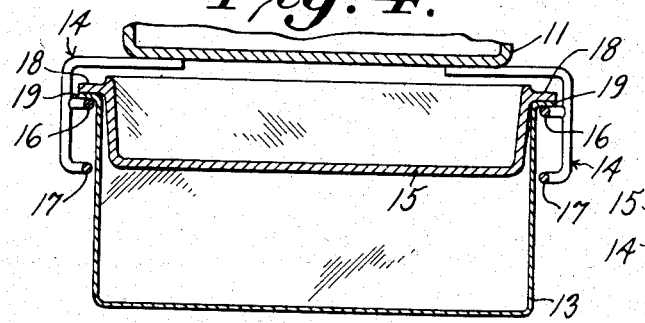
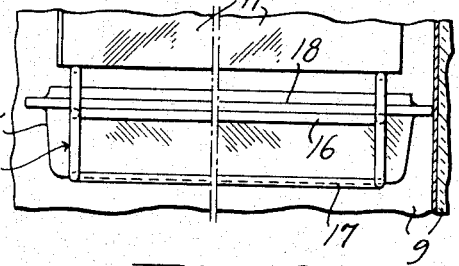
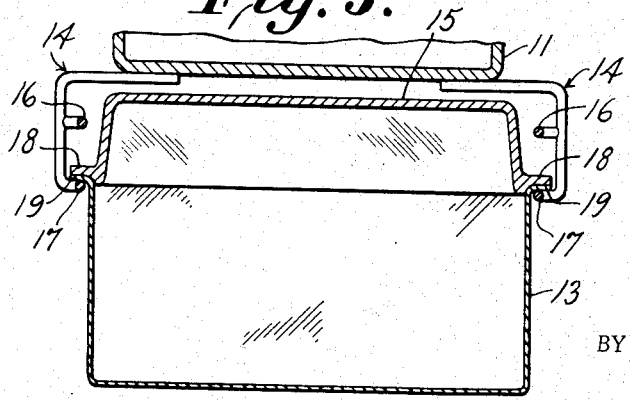
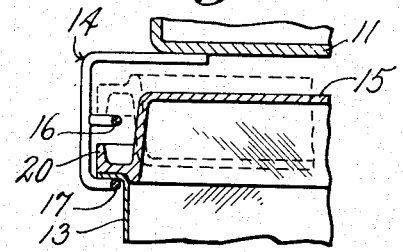
INVENTOR.
Wm. T. Hedlund
BY D. E. Heath
ATTORNEY Patented May 5, 1942

2,281,690

UNITED STATES PATENT OFFICE 2,281,690

REFRIGERATOR

William T. Hedlund, New Rochelle, N. Y., assignor to Servel, Inc., New York, N. Y., a corporation of Delaware Application June 5, 1940, Serial No. 338,833

4 Claims. (Cl. 62—89)

My invention relates to refrigerators and more particularly to the storage of food in domestic refrigerators.

The object of my invention is to provide greater flexibility and better utilization of food storage space.

It is known to provide so-called vegetable fresheners in domestic refrigerators. These are usually in the form of relatively deep pans from four to six inches in height. They may be covered to keep moisture from leaving the pan. Such pans are usually placed at the bottom of the refrigerated space.

The coldest place in a domestic refrigerator is just below the evaporator. This is a good place for preservation of meat. Usually, however, this space is taken up by a drip pan for receiving any water dripping from the evaporator. Such a drip pan may be placed at different levels and meat placed in the drip pan. However, there is some objection to having the drip from the evaporator fall on or around the meat and also the meat is kept better if it is covered so as not to become dried out due to condensation and frost formation on the evaporator.

In accordance with the invention, and in order to avoid the stated objection, I provide an arrangement whereby the vegetable pan can be used in its normal capacity and can also be used as a meat pan or meat-keeper. In order to accommodate a sizable piece or several pieces of meat, I arrange the drip pan so that it may be used as a cover for the vegetable pan when used as a meat-keeper. I also arrange the drip pan to act as a drip receiver when used as a cover.

The more complete nature of my invention and additional advantages thereof will become more apparent from consideration of the following description taken in conjunction with the accompanying drawing, of which:

Fig. 1 is a front view of a refrigerator embodying the invention;

Fig. 2 shows a modified arrangement of parts in the refrigerator;

Fig. 3 is a side view taken on line 3—3 of Fig. 1;

Fig. 4 shows a drip pan as a cover for a vegetable pan;

Fig. 5 shows a drip pan inverted and placed on a vegetable pan to provide a large meat keeper; and Fig. 6 shows a modification of drip pan construction.

The refrigerator 10 includes insulated walls 9 and an insulated door 8 bounding a food storage space 7. In space 7 is an evaporator or cooling coil 11 forming part of a refrigerating system of any usual kind used in domestic refrigerators. The evaporator 11 may be placed centrally of the food space, as shown, or to one side, but it should be in the upper part of the food space. Evaporation of refrigerant in the evaporator produces cold which refrigerates the food space 7.

The evaporator cools the air in the food space. An internal circulation or convection of air is produced. As the air immediately adjacent the evaporator is cooled, it becomes relatively heavy and sinks in a downward stream just below the evaporator. Warmer air is thus displaced and moves upwardly adjacent outer walls and the door. Thus different parts of the food storage space are at different temperatures, the coldest being just below the evaporator in what I have designated as zone A in Fig. 2.

As air is cooled, it is less able to hold the moisture in vapor form. Below a certain temperature for given conditions, moisture will precipitate. As the air passes over the evaporator and is cooled, moisture is likely to precipitate on the evaporator and congeal or freeze. At other times this frost melts. The drip of melting frost is caught in a shallow drip pan 15 placed just beneath the evaporator and supported by structure 14 secured to the underside of the evaporator and including a plurality of slide-ways 16 and 17 formed by horizontal bars or rods adapted to receive in sliding engagement the flange 18 at the upper edge of the drip pan. When used merely as a drip pan, vessel 15 is usually placed on the slide-way 16 nearest the evaporator so as to give maximum utilization of the shelf just below.

Drip pan 15 being positioned in the coldest part of the food storage space (except inside the evaporator), it can be used to hold meat or fish which is advantageously kept at low temperature. When the meat or fish is of large size, the drip pan may be placed on the lower slide-way 17. There are objections to this use of the drip pan, particularly as it cannot be covered in the lower position when containing food taller than the drip pan itself. Drip from the evaporator is likely to fall on the food. The food is dried. Most meat is preferably kept moist.

An evaporator which frosts is a dehydrator. When the air which flows over the evaporator is reheated in other parts of the food space it becomes dry and the warmer dry air takes up moisture from the food. This drying process has started as soon as the air has started flowing down from the bottom of the evaporator. The air in its circuit is, really, a vehicle for removing moisture from food, carrying it to the evaporator, and depositing it on the evaporator.

Most domestic refrigerators include so-called vegetable fresheners which are merely covered pans to prevent the circulating air from extracting the moisture from vegetables placed in the pan. Preferably such pans are entirely closed to keep all moisture in the pan. Such vegetable pans are usually placed remote from the evaporator as shown at 13. Pans 13 may be provided with flanges 19 engageable in slide-ways 21 mounted in any suitable manner as on uprights or on the underside of the lowest shelf 22. The vegetable pans 13 are provided with covers or fit closely under the imperforate shelf 22. They are preferably from four to six inches deep.

As can be seen in Figs. 4, 5 and 6, I provide the vegetable pans and the drip pan so that they are interchangeable in the slide-ways 16, 17 and 21. Also these parts are so constructed that the drip pan constitutes a cover for the vegetable pan either in upright or inverted positions. In this way I provide a good-sized meat or fish keeper which is closed whereby the food in it is kept moist, and which can be used directly under the evaporator in the coldest place and which does not necessitate "extra" pans, which are a nuisance, and which meets the desired object without having so large a supporting structure under the evaporator as to materially interfere with use of the next lower shelf.

As can be seen in Fig. 4, the drip pan 15 may be used in upright position as a cover for the vegetable pan, which may then be placed on either slide-way 16 or 17. For larger meat storage, the drip pan 15 may be inverted and placed on top of pan 13, the closed receptacle thus formed being placed on the lower slid-way 17 as shown in Fig. 5. A flange 20 may be provided on drip pan 15 so as to provide a trough for catching drip when the drip pan is inverted as shown in Fig. 6.

It will be seen that the invention provides great versatility in utilization of refrigerator space. Obviously variations are possible within the scope of the invention.

What I claim is:

1. In a refrigerator having a food storage compartment and a cooling unit in said compartment, a first container, a second container, said containers comprising pans, the pan forming said second container being shallower than the pan forming said first container and adapted to fit within said first container and having a ledge adapted to so seat on said first container that said second container closes the top of and forms a cover for said first container, and supports to hold said pans at selectively different elevations beneath said cooling unit, one of said containers having a projecting part which overlaps the other of said containers to restrict lateral movement between said containers when said second container is placed on said first container to also form a cover therefor in an inverted position.

2. Structure as in claim 1 in which said ledge on said second container forms a channel so that said second container in both upright and inverted positions holds moisture dripping thereon from said cooling unit.

3. Structure as in claim 1 in which said supports are slideways, and said first container is also provided with a ledge which is engageable with said slideways.

4. Structure as in claim 1 in which said supports are a plurality of vertically aligned slideways, and said first container is provided with a ledge engageable with said slideways, said ledge on said second container also being engageable with said slideways in both upright and inverted positions of said second container so that said containers may be each supported on different slideways.

WILLIAM T. HEDLUND.